US010352282B2

(12) United States Patent
Colvin

(10) Patent No.: US 10,352,282 B2
(45) Date of Patent: Jul. 16, 2019

(54) HYDRAULIC UNION BALL TUBE WITH LEAK DIFFUSION

(71) Applicant: Corey Jay Colvin, Cottonwood, AZ (US)

(72) Inventor: Corey Jay Colvin, Cottonwood, AZ (US)

(*) Notice: Subject to any disclaimer, the term of this patent is extended or adjusted under 35 U.S.C. 154(b) by 186 days.

(21) Appl. No.: 15/242,202

(22) Filed: Aug. 19, 2016

(65) Prior Publication Data

US 2017/0058851 A1 Mar. 2, 2017

Related U.S. Application Data

(60) Provisional application No. 62/213,050, filed on Sep. 1, 2015.

(51) Int. Cl.
*F02M 55/02* (2006.01)
*F16L 27/04* (2006.01)
*F02M 61/14* (2006.01)

(52) U.S. Cl.
CPC .......... *F02M 55/02* (2013.01); *F02M 61/14* (2013.01); *F16L 27/04* (2013.01); *F02M 2200/856* (2013.01)

(58) Field of Classification Search
CPC ......... F16L 27/04; F02M 61/14; F02M 55/02; F02M 2200/856
USPC ............................................... 285/121.7, 261
See application file for complete search history.

(56) References Cited

U.S. PATENT DOCUMENTS

| | | | | |
|---|---|---|---|---|
| 4,356,998 A * | 11/1982 | Bach | ........................ | F16L 27/04 285/261 X |
| 4,371,198 A * | 2/1983 | Martin | .................... | F16L 27/04 |
| 5,071,402 A | 12/1991 | Weyant, Jr. | | |
| 6,073,816 A | 6/2000 | Granberg | | |
| 6,374,806 B1 * | 4/2002 | Keeley | .................... | F16L 27/04 |
| 8,683,695 B2 | 4/2014 | Rasmussen et al. | | |
| 2003/0156893 A1 * | 8/2003 | Takagi | .................... | F16L 27/04 |
| 2005/0082823 A1 * | 4/2005 | Neumaier | .............. | F02M 55/02 |
| 2010/0187256 A1 | 7/2010 | Draisma | | |

* cited by examiner

*Primary Examiner* — Greg Binda
*Assistant Examiner* — Zachary T Dragicevich
(74) *Attorney, Agent, or Firm* — Morrison and Foerster LLP

(57) ABSTRACT

A fluid delivery system capable of impeding fluid flow along its outer surface. According to the examples of the disclosure, the fluid delivery system features deflection features designed to deflect fluid flow from one location away from another location. The fluid delivery system's ability to impede fluid flow along its surface prevents damages to other parts of the system, the system operator, or other objects caused by the fluid flow.

15 Claims, 3 Drawing Sheets

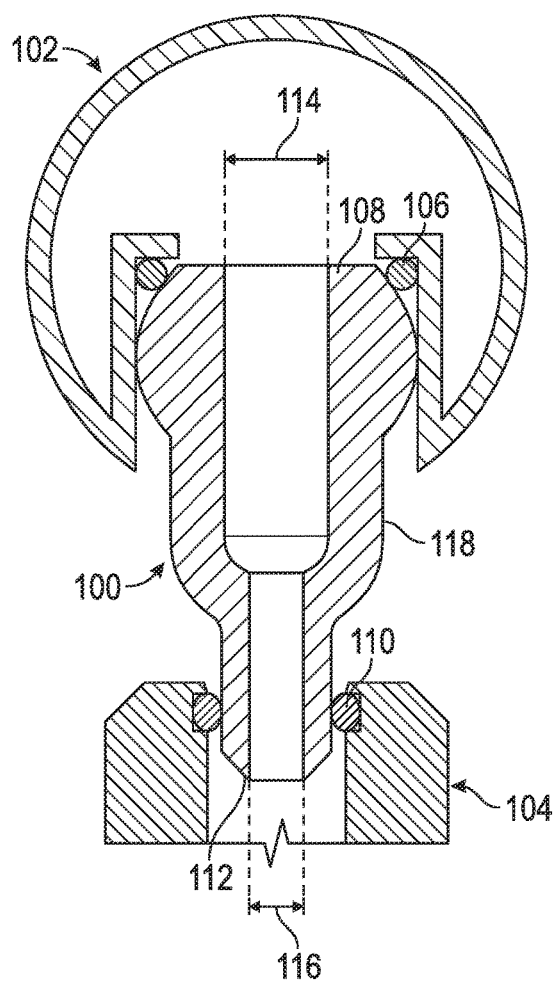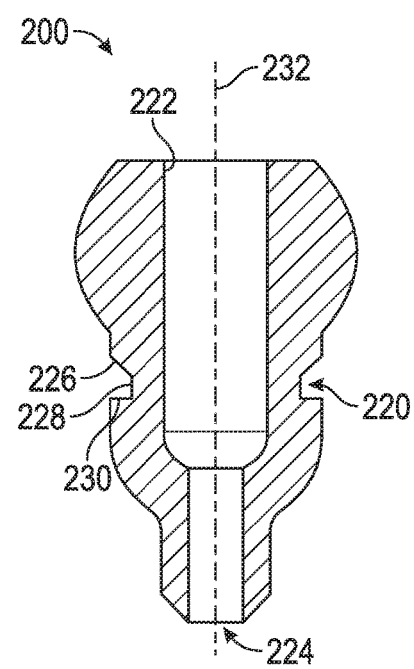
FIG. 1
FIG. 2

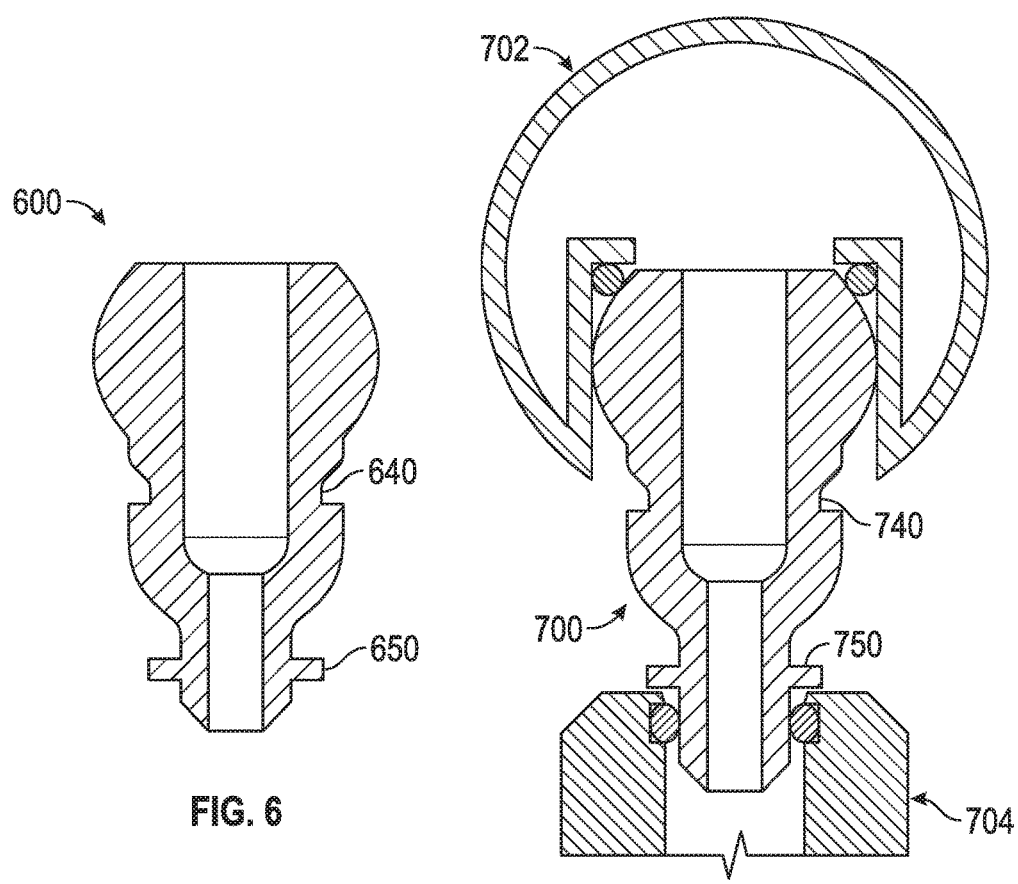

HYDRAULIC UNION BALL TUBE WITH LEAK DIFFUSION

CROSS-REFERENCE TO RELATED APPLICATIONS

This application claims benefit of U.S. Provisional Patent Application No. 62/213,050, filed Sep. 1, 2015, which is hereby incorporated by reference it its entirety.

BACKGROUND

A. Field of the Disclosure

This relates to fluid delivery systems, and more particularly, to a fluid delivery system such as a ball tube connecting a high-pressure oil rail to a diesel fuel injector featuring deflection features to deflect leaked fluids.

B. Background

The fuel injector system used on a 6.0L diesel or VT365 class engine, for example, features a ball tube as a pivotable hydraulic union between a high-pressure oil rail and the fuel injectors. This example ball tube accommodates motion between the oil rail and the fuel injector in three dimensions. It features a wide-diameter ball end connected to the oil rail and has a narrower diameter at the fuel injector end. The oil delivered by the ball tube provides the hydraulic force necessary for the fuel injector to atomize diesel fuel for combustion.

Over time, exposure to oil, heat and high pressures at the ball end of the tube cause the seal on that end to harden, reducing the seal's efficacy and causing leaks. These leaks allow high-pressure oil to reach the seal at the injector end via fluid dynamics along the smooth outer surface of the ball tube. When these leaks reach the other end of the ball tube, the high-pressure oil abrasively wears away at the fuel injector seal in a manner similar to a sand blaster. This failure mode removes material from the seal at the fuel injector end, which leads to a bigger leak than one caused by a hardened seal, which is the common failure mode for the seal at the oil rail end of the ball tube. Eventually, the leak becomes large enough to decrease the oil pressure to the point where the oil cannot hydraulically drive the fuel injector. The oil can cease to drive the fuel injector either because the engine PCM senses inadequate oil pressure to fire the injectors and does not command the fuel injectors to open or simply because the oil pressure is too low for the system to function, even with the fuel injectors opened. This failure results in a no start situation, putting the vehicle in a non-running condition. Thus, there is a need in the field of diesel engines, and more particularly the field of fuel injectors, for a fluid delivery system that prevents the hydrodynamic flow of fluids along the outside of the delivery mechanism.

SUMMARY OF THE DISCLOSURE

This relates to a fluid delivery system capable of deflecting escaped fluid. According to some examples of the disclosure, the fluid delivery system includes deflection features that can disrupt a hydrodynamic flow of fluids along an exterior surface of a fluid delivery tube. Thus, damage to other parts of a larger system, the device operator, or objects near the fluid delivery system can be avoided as the fluid is diverted away from fluid-sensitive areas.

BRIEF DESCRIPTION OF THE DRAWINGS

FIG. 1 illustrates a cross-section of a ball tube connecting a high-pressure oil rail to a fuel injector according to examples of the disclosure.

FIG. 2 illustrates a cross-section of a ball tube with a deflection groove according to examples of the disclosure.

FIG. 5-B illustrates an example washer for use in the assembly shown in FIG. 5-A according to examples of the disclosure.

FIG. 6 illustrates cross-section of a ball tube with both a deflection ridge and a deflection groove according to examples of the disclosure.

FIG. 7 illustrates a cross-section of a ball tube with both a deflection ridge and a deflection groove connecting a high-pressure oil rail to a fuel injector according to examples of the disclosure.

DETAILED DESCRIPTION

Figure 3:
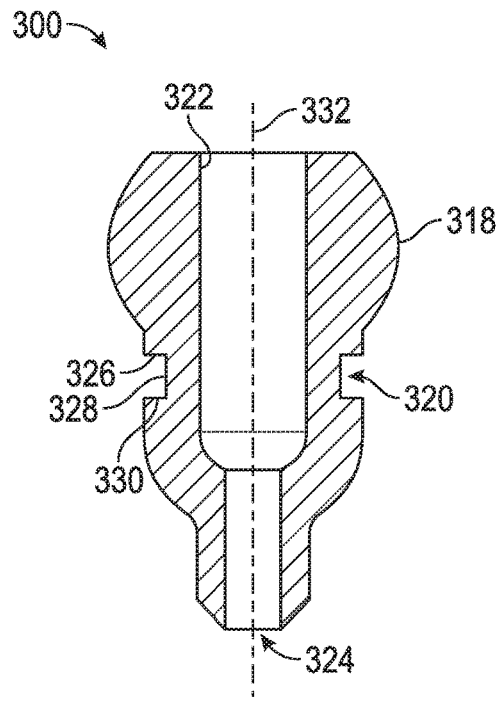
FIG. 3 illustrates a cross-section of a ball tube with a deflection notch according to examples of the disclosure.

In the following description, reference is made to the accompanying drawings which form a part hereof, and in which it is shown by way of illustration specific examples which can be practiced. It is to be understood that other examples can be used and structural changes can be made without departing from the scope of the examples of this disclosure.

This relates to a fluid delivery system capable of deflecting escaped fluid. In this application, the term "fluid" is used in reference to any liquid, gas, or plasma that behaves according to fluid dynamics. According to some examples of the disclosure, the fluid delivery system features deflection features that disrupt hydrodynamic flow of fluids along the exterior surface of the fluid delivery tube. Thus, damage to other parts of a larger system, the device operator, or objects near the fluid delivery system, for example, can be avoided as the fluid is diverted away from fluid-sensitive areas.

FIG. 1 illustrates a cross-section of a fuel injector ball tube 100 as one example of a flexible hydraulic union according to examples of the disclosure. The ball tube 100 can be in fluid communication with a high pressure oil rail 102 and a fuel injector 104 (both shown in cross-section in FIG. 1) to deliver high-pressure oil to the injector 104. Note that although examples of the disclosure as described herein may refer to the delivery of high-pressure oil, it should be understood that the examples of the disclosure are not so limited, but can extend generally to the delivery of high pressure fluid in general. An O-ring 106 can be located at a first end 108 of the ball tube 100 that connects to the oil rail 102. Likewise, a similar example O-ring seal 110 can be located at a second end 112 of the ball tube 100 that can be in fluid communication with the fuel injector 104.

The ball tube 100 can have an increased diameter 114 at the side connecting to the oil rail 102 and a smaller diameter 116 at the end that delivers the oil to the fuel injector 104. The outer surface 118 of the ball tube 100 can be generally smooth, without any sharp angles. Therefore, when oil leaks past the upper O-ring seal 106, it can travel along the outside 118 of the tube 100 to the fuel injector seal 110. Over time, the seal 110 can become degraded by the high-pressure oil, which can remove material from the seal. Compared to leaks caused by a hardened seal, such as the kind of leaks that may occur at the ball end seal 106, a leak caused by the abrasive removal of seal material can be much larger. Therefore, a leak at the fuel injector side 112 that may have been caused by abrasive material removal by high-pressure oil decreases oil pressure to the point that the oil cannot hydraulically drive the diesel fuel in the fuel injector 104. The oil can cease to drive the fuel injector either because the engine PCM senses inadequate oil pressure to fire the injectors and does not command the fuel injectors to open or simply because the oil pressure is too low for the system to function, even with the fuel injectors opened. This condition results in no-start situation, making the vehicle inoperable. Therefore, there is a need for a fluid delivery system capable of deflecting escaped fluid from a first end of the fluid delivery system.

As an example, FIG. 2 depicts a ball tube 200 for use in the system depicted in FIG. 1, though other examples would be applicable to a plurality of other systems. The ball tube 200 can include a deflection groove 220. As shown here, escaped fluid from a first end 222 of the tube 200 flowing along the outer surface of the tube can be interrupted by the deflection groove 220 before it reaches a second end 224. In other examples, fluid can be diverted away from other objects which may or may not be part of the fluid delivery system.

The deflection groove 220 shown here as an example can include three flat surfaces 226, 228, and 230; though other examples may have any number of faces or may be curved or have other surface contours. As an illustration, a first face 230 situated toward the second end 224 of the tube 200 and facing the first end 222 of the tube 200 can be normal to the tube's longitudinal axis 232, though other angles can also be used to deflect escaped fluids. A second face 226 situated towards the first end 222 of the tube 200 and generally facing the second end 224 of the tube 200 may or may not be situated at some angle more gradual than that of the first face 230. A gradual angle of 15-70 degrees or greater, for example, or 28 degrees in one example, though other examples may use one or more grooves with any angles, can prevent fluids from skipping over the groove 220. Lastly, a third face 228 can be formed between the first two faces 226 and 230 that defines a distance between them. The third face 228 can be sufficiently long with a length between 0.01 and 0.5 inches or greater, for example, or 0.05 inches in one example, though other examples may use one or more grooves of any lengths, for the fluid to be deflected, though other examples may feature a third face of any length or may feature only two faces similar to the first and second faces 226 and 230 that meet in a sharp or rounded junction.

FIG. 3 illustrates another example ball tube for use in the fuel injector system shown in FIG. 1, though other examples could be implemented in other systems. The ball tube 300 shown in FIG. 3 can include a deflection notch 320 having a first face 330 situated toward a second end 324 of the tube 300 and facing a first end 322 of the tube 300 and a second face 326 situated toward a first end 322 of the tube 300 and facing second end 324 of the tube 300. In this example, the first and second faces 326 and 330 may both be normal to the longitudinal axis 332. The notch faces 326 and 330 can be sufficiently deep with a depth between 0.05 and 0.5 inches or greater, for example, or 0.146 inches in one example, though other examples may use one or more notches of any depths, relative to the outer surface 318 of the tube 300 to deflect fluid. In addition, the notch floor 328 can be sufficiently long with length 0.005 to 0.5 inches or longer, for example, or 0.05 inches in one example, though other examples may use one or more notches of any lengths, that is, faces 326 and 330 can be sufficiently far apart to deflect fluids. In this example, the three notch faces 326, 328, and 330 are joined with sharp corners. Other examples may feature curved junctions or any number of faces.

Figure 4:
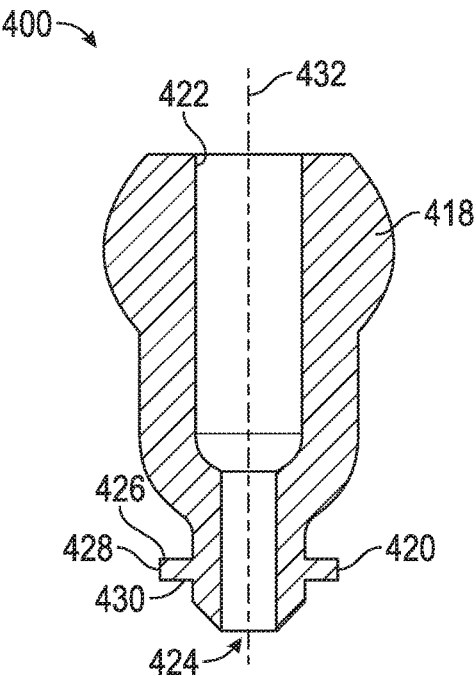
FIG. 4 illustrates a cross-section of a ball tube with a deflection ridge according to examples of the disclosure.

FIG. 4 depicts another example of the present disclosure. This example is a ball tube 400 for use in the system depicted in FIG. 1, though other examples could be implemented in other systems. The ball tube 400 can include a deflection ridge 420 to impede leaks at a first end 422 from reaching a second end 424. In this example, the fluid can be motor oil but other examples could be used to deflect other fluids, including but not limited to other liquids, including water, or a gas, such as pressurized air, as examples.

The deflection ridge 420 can include two outer faces 426 and 430. In FIG. 4, a first face 426 can be situated towards and facing the first end 422 and a second face 430 can be situated towards and facing the second end 424. These faces 426 and 430 each form an angle relative to the tube's longitudinal axis 432 which may or may not be 90 degrees, as drawn. Furthermore, the faces 426 and 430 need not form the same angles relative to the longitudinal axis 432. The ridge 420 also has a width 428 which may be between 0.01 and 0.1 inches or wider, for example, or 0.03 inches in one example, though other examples may use one or more ridges of any widths, relative to the height which may be 0.005 to 0.5 inches or higher, for example, or 0.05 in one example, though other examples may use one or more ridges of any heights, of the faces 426 and 430 from the outer surface 418 of the tube 400. In this example, faces 426, 428, and 430 meet at sharp right angles, as drawn. In other examples, however, there may be any number of faces that meet at any angle at curved or sharp junctions.

Figure 5A:
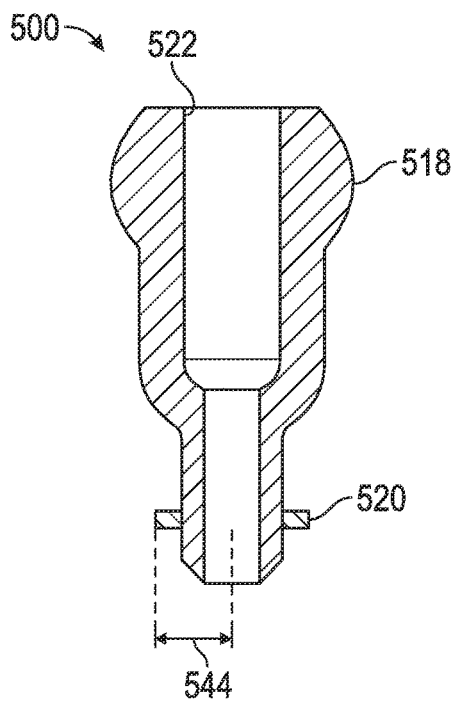
FIG. 5-A illustrates a cross-section of a ball tube fitted with a deflection washer according to examples of the disclosure.
Figure 5B:
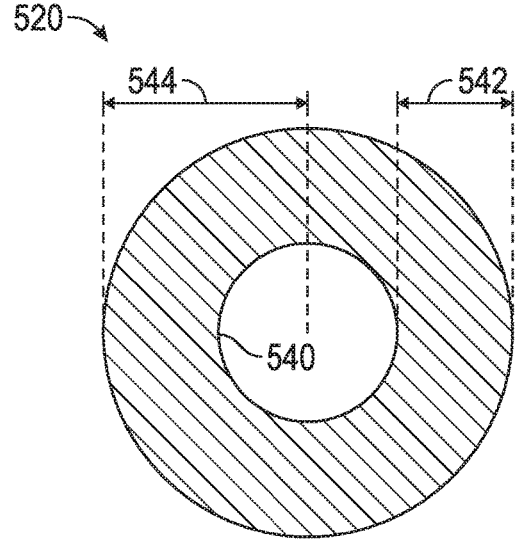

In FIG. 4, the deflection ridge 420 is drawn as a feature of the example ball tube 400 where the tube 400 and the ridge 420 are machined from a single piece of material, as one example. Another example, shown in FIG. 5A, however, illustrates a washer 520 fitted around a ball tube 500 to deflect a fluid, such as motor oil. An example washer 520 is shown in FIG. 5B, illustrating the washer's inner circumference 540, outer circumference 542, and outer diameter 544. When applied to the system, the washer can be dimensioned to fit snugly around the outer surface 518 of the ball tube 500 (e.g., frictionally coupled to the tube) to impede fluid leaks between the two parts. In some examples, the washer 520 may be formed in part or entirely of a compressible material such as hard rubber or viton to assist in adhesion to the tube. The washer 520 may fit with or without an adhesive, interconnecting shape features, or other methods or devices to create a seal between the washer 520 and the ball tube 500. For example, a lock washer with inward facing teeth, a snap ring, a circlip, a threaded locknut, or other press-on lock washers or other retention mechanisms capable of screwing onto the body of the ball tube can be employed. The ball tube 500 and washer 520 assembly can deflect fluids escaped from a first end 522 of the tube 500 when the washer 520 height 542 is high enough with height 0.03 to 0.5 inches or greater, for example, or 0.05 inches in one example, though other examples may use one or more washers of any heights.

It should be understood that although the various examples described above may be described and illustrated separate from other examples, in other examples, such as the one in FIG. 6, a plurality of deflection features may exist. An example ball tube 600 in FIG. 6 may have both a ridge 650 and a groove 640, as previously described in the specification. Other combinations are possible as well, including more than two deflection features. Similar examples may be applicable to a plurality of systems and applications different from those described in the disclosure.

As an example, in the field of fuel injectors, the high-pressure oil delivery rail can be pivotable, meaning it can accommodate motion between the oil rail and the fuel injector in three dimensions. FIG. 7 shows an example ball tube 700 that can deliver high-pressure oil between a high pressure oil rail 702 and a fuel injector 704, much like the system in FIG. 1. A deflection groove 740 and a deflection ridge 750 can be positioned such that motion between the ball tube 700 and the oil rail 702 and motion between the ball tube 700 and the fuel injector 704 will not be obstructed. For example, ridge 750 can be positioned above the fuel injector 704 in an area where the protrusions of the ridge will not interfere with lateral movement of the tube. Groove 740 can be positioned below the ball end of the tube in an area where the walls of the tube can be thicker than the fuel injector end. In other examples, if multiple deflection features are employed, one or more first deflection features that are best suited for deflecting larger quantities of oil may be located closer to the oil rail, while one or more second deflection features that are best suited for deflecting smaller quantities of oil may be located closer to the fuel injector. In some examples, the placement of the deflection features relative to each other may vary. For example, two or more deflection features may be placed right next to each other in some examples or may be separated by any distance in other examples. In this manner, oil that gets past the one or more first deflection features and continues to adhere to the outer walls of the tube may be deflected by the different design of the one or more second deflection features. The fuel injector assembly is shown as just one example of the present disclosure. Other fields and systems may also have the need to accommodate motion between two parts connected to a fluid conveyance.

Examples may also pertain to hydraulic systems where the hydraulic fluid is a liquid other than oil. Such an example may be applied in the art of garden hoses, power washers, or other hydraulic systems in which the high-pressure fluid is water. In these fields, the deflection features could serve to keep objects along the length of the fluid delivery line dry and/or prevent high-pressure leaks from degrading seals, harming the device operator or causing other damage.

Furthermore, examples may pertain to pneumatic systems in which the high-pressure fluid is a gas, such as air. An example may be applied in the art of a paint gun to prevent escaped air from disrupting the stream of paint expelled from the paint gun's airbrush tip, damaging seals, harming the device operator or causing other damage.

As such, the need exists in a plurality of fields related to the transmission of fluids for escaped fluids to be deflected from the exterior of a system's fluid delivery line.

According to the above, some examples of the disclosure are related to a fluid delivery system comprising: a fluid conveyance oriented along a first axis and configured for delivering fluid from a first location to a second location comprising one or more inlets, one or more outlets, an inner surface, and an outer surface; and one or more fluid deflection features on the outer surface of the fluid conveyance wherein the one or more fluid deflection features are configured to impede a flow of fluid along the outer surface of the conveyance from a third location to a fourth location. Additionally or alternatively to one or more of the examples described above, the deflection feature comprises a circumferential protrusion. Additionally or alternatively to one or more of the examples described above, the circumferential protrusion comprises a circumferential ridge. Additionally or alternatively to the examples shown above, the circumferential ridge comprises a first face configured toward the third location at an angle with respect to the first axis to impede fluid flow along the outer surface of the fluid conveyance from the third location to the fourth location. Additionally or alternatively to one or more of the examples described above, the circumferential ridge comprises a first face having a height with respect to the outer surface of the fluid conveyance configured to impede fluid flowing along the outer surface of the fluid conveyance from the third location to the fourth location. Additionally or alternatively to one or more of the examples described above, the fluid conveyance may be a pivotable union between the first location and the second location, wherein the circumferential ridge is positioned along the fluid conveyance such that the motion of the fluid conveyance is not obstructed. Additionally or alternatively to one or more of the examples described above, the circumferential protrusion comprises a washer. Additionally or alternatively to one or more of the examples described above, the washer is secured by friction against the outer surface of the fluid conveyance. Additionally or alternatively to one or more of the examples described above, the washer is secured around the outer surface of the fluid conveyance to reduce leaks between the washer's inner diameter surface and the outer surface of the fluid conveyance. Additionally or alternatively to one or more of the examples described above, the washer has a height relative to the outer surface of the fluid conveyance configured to impede fluid flowing along the outer surface of the fluid conveyance from the third location to the fourth location. Additionally or alternatively to one or more of the examples described above, at least one fluid deflection feature comprises a circumferential recess. Additionally or alternatively to one or more of the examples described above, at least one circumferential recess comprises a circumferential groove comprising a first face situated at some angle towards the third location and a second face situated at some angle towards the fourth location. Additionally or alternatively to one or more of the examples described above, the first face of the circumferential groove situated towards the third location is situated at an angle relative to the first axis to impede the flow of fluids along the outer surface of the fluid conveyance from the third location to the fourth location. Additionally or alternatively to one or more of the examples described above, the first face of the circumferential groove situated towards the third location has a height with respect to the fluid conveyance's outer surface to impede fluid flow along the fluid conveyance's outer surface from the third location to the fourth location. Additionally or alternatively to one or more of the examples described above, the second face of the circumferential groove situated towards the fourth location is situated at an angle relative to the first axis that impedes the flow of fluid along the fluid conveyance's outer surface from the third location to the fourth location by directing some or all of the fluid towards the first face of the groove. Additionally or alternatively to one or more of the examples described above, the first and second faces of the circumferential groove are situated at a distance to impede the flow of fluid along the fluid conveyance's outer surface from the third location to the fourth location. Additionally or alternatively to one or more of the examples described above, the circumferential recess comprises a circumferential notch comprising: a first face situated towards the third location, and a second face situated towards the fourth location; wherein the first and second faces are normal to the first axis along which the fluid conveyance is situated. Additionally or alternatively to one or more of the examples described above, the first and second faces of the circumferential notch are separated by a distance to impede the flow of fluid along the fluid conveyance's outer surface from the third location to the fourth location.

Some examples of the disclosure are directed to a fluid delivery system comprising: means for delivering fluid from a first location to a second location; and means for impeding fluid flow along the system's outer surface from a third location to a fourth location. Additionally or alternatively to one or more of the examples shown above, the means for impeding the fluid flow comprises circumferential recess means for deflecting the fluid flow along the system's outer surface. Additionally or alternatively to the one or more of examples shown above, the means for impeding the fluid flow comprises circumferential protrusion means for deflecting the fluid flow along the system's outer surface. Additionally or alternatively to one or more of the examples shown above, the means for impeding the fluid flow comprises a plurality of deflection feature means, wherein each individual deflection feature means of the plurality of deflection feature means is a circumferential notch means or a circumferential protrusion means.

Although examples have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:

1. A fluid delivery system comprising:
  a fluid conveyance oriented along a first axis and configured for delivering fluid from a first location to a second location, the fluid conveyance comprising one or more inlets, one or more outlets, an inner surface, an outer surface, and a ball portion at which the outer surface of the fluid conveyance has a convex shape;
  a circumferential recess on the outer surface of the fluid conveyance, the circumferential recess separated from the ball portion of the fluid conveyance by a portion of the outer surface of the fluid conveyance that is substantially parallel to the first axis;
  an oil rail fluidly coupled to the fluid conveyance at the first location; and
  a fuel injector fluidly coupled to the fluid conveyance at the second location,
  wherein:
    the circumferential recess comprises a first face situated at a first angle relative to the first axis facing a third location to impede the flow of fluids along the outer surface of the fluid conveyance from the third location to a fourth location, and a second face situated at a second angle relative to the first axis facing the fourth location, and
    the circumferential recess is configured to impede a flow of fluid along the outer surface of the conveyance from the third location to the fourth location.

2. The fluid delivery system of claim 1, wherein the circumferential recess comprises a circumferential groove.

3. The fluid delivery system of claim 1, wherein the first face situated towards the third location has a height with respect to the conveyance's outer surface to impede fluid flow along the fluid conveyance's outer surface from the third location to the fourth location.

4. The fluid delivery system of claim 1, wherein the second face situated towards the fourth location is situated at an angle relative to the first axis that impedes the flow of fluid along the fluid conveyance's outer surface from the third location to the fourth location by directing some or all of the fluid towards the first face of the groove or outward away from the first axis.

5. The fluid delivery system of claim 1, wherein the first and second faces are situated at a distance to impede the flow of fluid along the fluid conveyance's outer surface from the third location to the fourth location.

6. The fluid delivery system of claim 1,
  wherein the first and second faces of the circumferential recess are substantially normal to the first axis.

7. The fluid delivery system of claim 6, wherein the first and second faces are separated by a distance to impede the flow of fluid along the fluid conveyance's outer surface from the third location to the fourth location.

8. The fluid delivery system of claim 1, further comprising:
  a first seal disposed between the fluid conveyance and the oil rail; and
  a second seal disposed between the fluid conveyance and the fuel injector.

9. The fluid delivery system of claim 1, wherein the first face of the circumferential recess is substantially normal to the first axis.

10. The fluid delivery system of claim 9, wherein the second angle is sloped with respect to the first axis.

11. The fluid delivery system of claim 10, wherein the second angle is in the range of 15 to 70 degrees.

12. The fluid delivery system of claim 1, wherein:
  the circumferential recess further comprises a third face situated between the first face and the second face, the length of the third face being in the range of 0.01 and 0.5 inches.

13. The fluid delivery system of claim 1, wherein:
  the fluid conveyance has a first diameter at the first location,
  the fluid conveyance has a second diameter at the second location, the second diameter less than the first diameter.

14. A fluid delivery system comprising:
  means for providing fluid to the fluid delivery system;
  means for delivering fluid from a first location to a second location, the means for delivering fluid comprising a ball portion at which an outer surface of the means for delivering fluid has a convex shape;
  means for impeding fluid flow along the system's outer surface from a third location to a fourth location, wherein the means for impeding fluid flow comprises a circumferential recess on the outer surface of the means for delivering fluid, the circumferential recess separated from the ball portion by a portion of the outer surface of the means for delivering fluid that is substantially parallel to a first axis along which the means for delivering fluid is oriented;
  an oil rail fluidly coupled to the means for delivering fluid at the first location; and
  a fuel injector fluidly coupled to the means for delivering fluid at the second location, wherein:
    the circumferential recess comprises a first face situated at a first angle relative to the first axis facing the third location to impede the flow of fluids along the outer surface of the means for delivering fluid from the third location to the fourth location, and a second face situated at a second angle relative to the first axis facing the fourth location.

15. The fluid delivery system of claim 14, wherein the means for impeding the fluid flow comprises a plurality of deflection feature means, wherein each individual deflection feature means of the plurality of deflection feature means is a circumferential recess means or a circumferential protrusion means.

\* \* \* \* \*